C. K. CONNER.
Corn-Harvester.

No. 208,005. Patented Sept. 10, 1878.

WITNESSES:
Francis McArdle
C. Sedgwick

INVENTOR:
C. K. Conner
BY Munn & Co
ATTORNEYS.

N. PETERS, PHOTO-LITHOGRAPHER, WASHINGTON, D. C.

2 Sheets—Sheet 2.

C. K. CONNER.
Corn-Harvester.

No. 208,005. Patented Sept. 10, 1878.

WITNESSES:
Francis McArdle,
C. Sedgwick

INVENTOR:
C. K. Conner.
BY Munn & Co
ATTORNEYS.

UNITED STATES PATENT OFFICE.

CHARLES K. CONNER, OF CAMP POINT, ILLINOIS.

IMPROVEMENT IN CORN-HARVESTERS.

Specification forming part of Letters Patent No. 208,005, dated September 10, 1878; application filed April 24, 1878.

*To all whom it may concern:*

Figure 1:
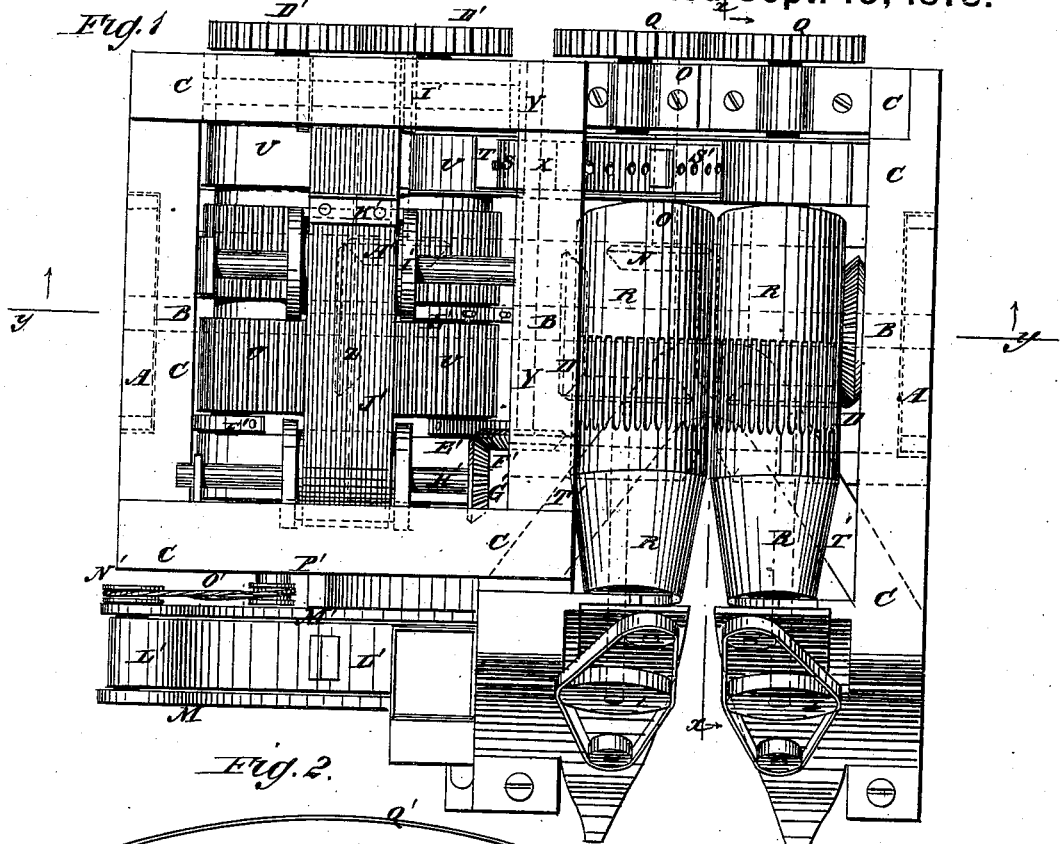
Figure 2:
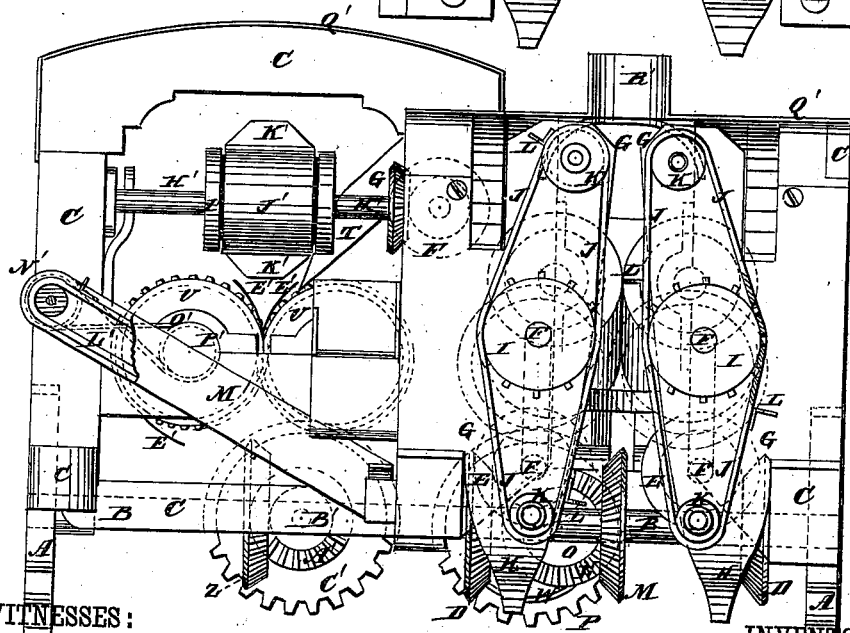
Figure 3:
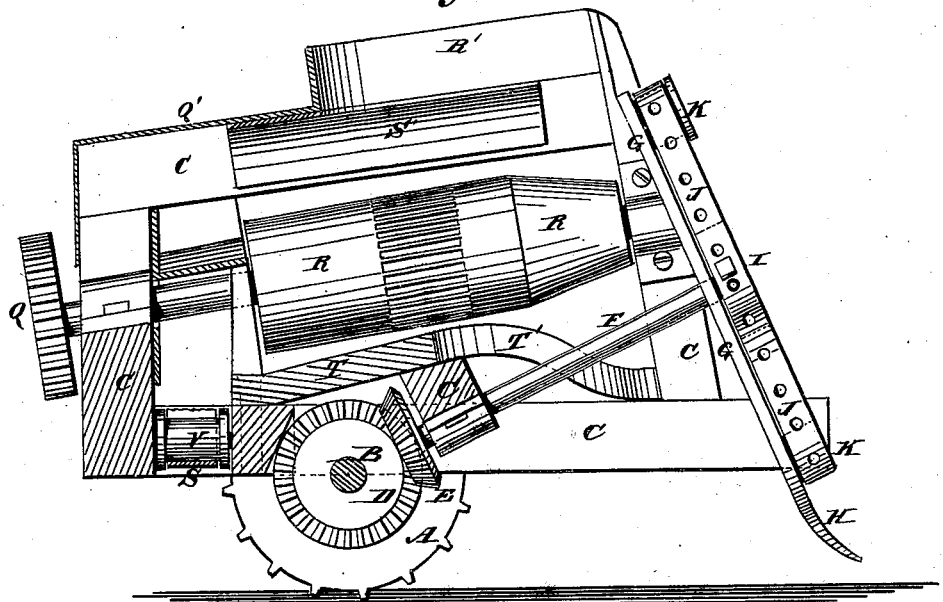
Figure 4:
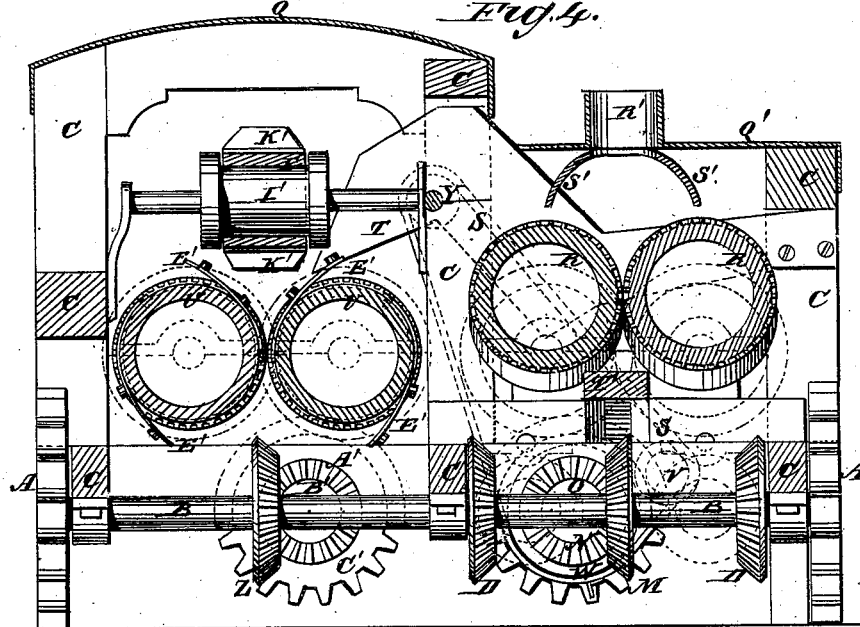

Be it known that I, CHARLES K. CONNER, of Camp Point, in the county of Adams and State of Illinois, have invented a new and Improved Corn-Husking Machine, of which the following is a specification:

Figure 1, Sheet 1, is a top view of my improved machine, the cover being removed. Fig. 2, Sheet 1, is a front view of the same. Fig. 3, Sheet 2, is a longitudinal section of the same, taken through the line $xx$, Fig. 1. Fig. 4, Sheet 2, is a vertical cross-section of the same, taken through the line $yy$, Fig. 1.

Similar letters of reference indicate corresponding parts.

The object of this invention is to furnish an improved machine for husking corn from the stalks while standing in the field, and which shall be simple in construction, convenient in use, and effective in operation, removing the ears from the stalks and husking them as it is drawn forward through the field, husking one row at a time.

The invention will first be described in connection with the drawing, and then pointed out in the claims.

A are the drive-wheels, the faces of which are corrugated to prevent them from slipping upon the ground, and which are rigidly attached to the ends of the axle B. The axle B revolves in bearings attached to the base of the frame C. To the axle B are attached two beveled-gear wheels, D, the teeth of which mesh into the teeth of two beveled-gear wheels, E, attached to the rear ends of the shafts F. The shafts F are placed in an inclined position, and revolve in bearings attached to the frame C and in the plates G. The plates G are attached to the forward end of the frame C in an inclined position, and upon their lower ends are formed hooks H, to raise the bent stalks, so that they may pass into the machine. To the forward ends of the shafts F are attached chain-wheels I, around which pass endless chains J. The chains J also pass around guide-pulleys K, pivoted to the upper and lower parts of the bars G. The chains J are provided with hooks or teeth L, to take hold of the stalks and draw them into the inclined space between the said endless chains J and the inner edges of the plates G. To the axle B is also attached a beveled-gear wheel, M, the teeth of which mesh into the teeth of a beveled-gear wheel, N, attached to the forward end of a shaft, O. The shaft O revolves in bearings attached to the frame C, and to its rear end, at the rear end of the machine, is attached a gear-wheel, P, the teeth of which mesh into the teeth of one of the gear-wheels Q, attached to the rear journals of the rollers R. The journals of the rollers R revolve in bearings attached to the frame C. The rollers R may be made wholly of iron, or the forward parts may be made of iron and their rear parts of wood, as may be desired.

The rollers R may be made smooth, or a part of their surfaces may be corrugated, as shown Figs. 1 and 3. The forward ends of the rollers R are slightly tapered, as shown in Figs. 1 and 3, to enable the stalks to pass between them readily. With this construction, as the machine is drawn forward, the stalks pass between the rollers R, and are drawn down between them by the revolution of the said rollers. As the ears come in contact with the rollers they are broken off, and pass back along the space between the said rollers. To facilitate this backward passage of the ears, the rollers R may be placed with their rear ends slightly inclined downward, as shown in Fig. 3. As the ears pass from the rear end of the rollers R they are received upon the buckets of the endless chain S, and are carried up and dropped into a spout, T, by which they are carried into the rear part of the space between the rollers U. The endless chain S passes around guide-pulleys V, pivoted to the frame of the machine, and is driven by the chain-wheel W, attached to the shaft O. The endless chain S also passes around the chain-wheel X, attached to the shaft Y, which revolves in bearings in the upper part of the frame C.

To the axle B is also attached a beveled gear-wheel, Z, the teeth of which mesh into the teeth of the beveled gear-wheel A′, attached to the shaft B′, which revolves in bearings in the lower part of the frame C, and to the rear end of which is attached a gear-wheel, C′, the teeth of which mesh into the teeth of one or the other of the gear-wheels D′, attached to the rear journals of the rollers U.

The rollers U are placed with their forward ends slightly inclined downward, and their faces are corrugated in whole or in part, to take hold of the husks and draw them from the ears as the said ears are passing along the space between the said rollers. In the rollers U are formed ring-grooves, in which are placed springs E'. The springs E' are attached at one end to the rollers U in the bottom of said grooves, and their other ends are left free, or are held from moving out too far by screws passing through slots in their said free ends and screwing into the said rollers. The springs E' are provided with points or spurs, as shown in Fig. 3, to take hold of the husks and assist in drawing them from the ears.

To the forward end of the shaft Y is attached a beveled-gear wheel, F', the teeth of which mesh into the teeth of a beveled-gear wheel, G', attached to a shaft, H'. The shaft H' revolves in bearings attached to the frame C, and to it is attached a pulley, I, around which passes an endless belt, J'. The belt J' also passes around other pulleys, I', pivoted to the frame C, and to it are attached projecting plates K', which are designed to take hold of the ears and move them along through the space between the rollers U.

As the husked ears pass from the forward end of the rollers U they are received upon the buckets of the endless belt L', which passes around pulleys or rollers pivoted to a frame, M', attached to the forward end of the frame C. To the journal of one of the said rollers is attached a pulley, N', around which passes a band, O'. The band O' also passes around the pulley P', attached to the forward journal of one of the rollers U, so that the said belt L' may be operated by the movement of the rollers U.

The frame M' and belt L' are so arranged as to carry up the ears to a sufficient height to allow them to be dropped into a wagon drawn at the side of the machine.

The machine is provided with a cover, Q', made of sheet-iron or other suitable material. The part of the cover over the rollers R is slotted and provided with an upwardly-projecting flange, R', around the said slot, to guide the upper ends of the stalks into the machine. To the cover Q, and directly above the rollers R, are attached concave plates S', to prevent the stalks or ears from passing over the tops of either of said rollers R. If desired, endless chains or a reel may be placed above the rollers R, to assist in moving the stalks and ears to the rearward between the said rollers; but this is not essential.

With this construction, as the machine is drawn forward the ears will be broken from the stalks by the rollers R, will be husked by the rollers U, and delivered to a wagon by the belt L'.

The machine, when in use, is drawn forward in such a way as to straddle the rows of corn to be husked. The frame of the machine is strengthened by the iron brace T', the rear end of which is attached to the lower rear part of the frame C. The forward part of the brace T' is branched, and the ends of its arms or branches are attached to the lower forward part of the frame C.

To the front of the machine are designed to be attached two rods, passing along the lower ends of the bars G. To the forward ends of these rods are to be attached, or upon them are to be formed, diamond-shaped pieces of iron, and also wheels, if necessary. To these rods will be fastened two small rods, to act as arms to separate the bent-down stalks from the next row.

Having thus fully described my invention, I claim as new, and desire to secure by Letters Patent—

1. The combination, with the rollers R, of the concave plates S', as and for the purpose described.

2. The combination of the gear-wheels F' G', the pulleys I', and the endless belt J', provided with the plates K', with the rollers U, for moving the ears along the said rollers U, substantially as herein shown and described.

3. The combination of the springs E', provided with points or spurs, with the grooved rollers U, substantially as herein shown and described.

CHARLES K. CONNER.

Witnesses:
 WM. T. KAY,
 GEORGE W. CYRUS.